Feb. 15, 1927. 1,618,117
J. T. TSCHOPP
NARROW LIGHT APERTURE AND METHOD OF MAKING THE SAME
Filed July 6, 1926

Inventor:
Jacob T. Tschopp,
by
His Attorney.

Patented Feb. 15, 1927.

1,618,117

UNITED STATES PATENT OFFICE.

JACOB T. TSCHOPP, OF SCHENECTADY, NEW YORK, ASSIGNOR TO GENERAL ELECTRIC COMPANY, A CORPORATION OF NEW YORK.

NARROW LIGHT APERTURE AND METHOD OF MAKING THE SAME.

Application filed July 6, 1926. Serial No. 120,590.

My invention is applicable to apparatus by which sound is recorded on and reproduced from a film, as for example, a moving picture film, but is useful also for other purposes. More particularly my invention relates to that part of such apparatus by means of which a light beam of the desired width engages the film in the process of making the record or passes through the film in the process of reproducing sounds recorded thereon. An object of my invention is the provision of improved means useful in such apparatus for determining the aperture through which light may pass to or through the film and the process of making the same.

My invention will be better understood from the following description taken in connection with the accompanying drawing, and its scope will be pointed out in the appended claims.

Figure 1:
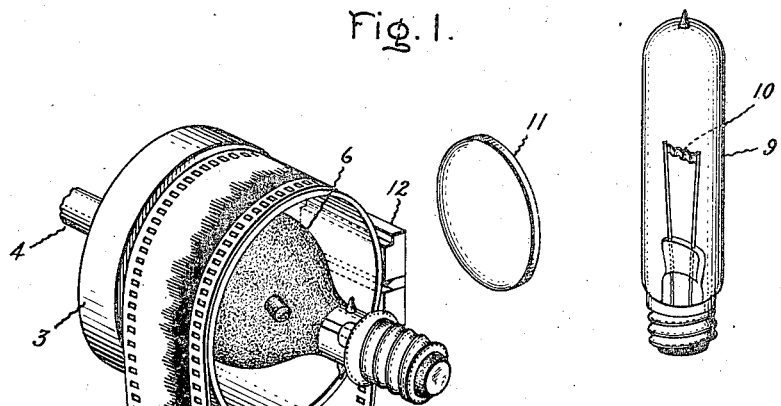
Figure 2:
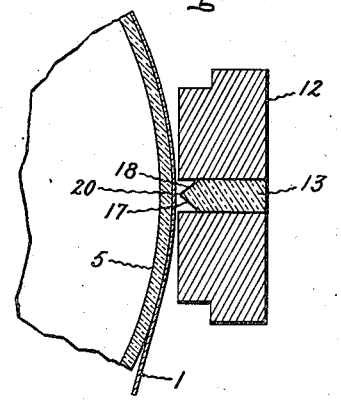

Referring to the drawing, Fig. 1 is a diagrammatic view showing apparatus involving my invention; Fig. 2 is a detail of the apparatus shown in Fig. 1 drawn to a larger scale; and Fig. 3 shows a further detail drawn to a still larger scale; and Fig. 4 shows a modification.

In Fig. 1 I have shown an arrangement by which the sounds previously recorded on a film may be converted into electrical impulses which correspond in wave form to the sound waves and which if suitably amplified and fed into a telephone receiver or loud speaker will reproduce the original sounds. The film 1 is illustrated as of the type commonly employed for motion pictures but having a sound record 2 thereon of a form such as shown for example in the copending application of Charles A. Hoxie, Serial No. 471,229 which is assigned to the same assignee as the present application. The film 1 is shown passing over a supporting and guiding pulley or roller 3 which is carried by the shaft 4. That portion 5 of the pulley through which light must pass is of transparent material. Within the pulley I have shown the photoelectric cell 6. Outside is the source of light 9 shown as an electric lamp having a ribbon filament 10, and arranged in alignment between the source and the window (not shown) of the photoelectric cell are the lens 11 and aperture holder 12 whereby light rays from the source are focused on the aperture and in passing therethrough enter the photo-electric cell. In the complete apparatus additional means may be found desirable to shield the photoelectric cell from the light of the source 9 and from other sources.

The holder 12, which for convenience I have illustrated as formed of two similar parts, supports the prism 13 therebetween through which light from the lamp 9 passes to the film. The prism 13 may be constructed of any suitable transparent substance, as for example, glass or quartz, but due to its more desirable optical qualities I prefer to use quartz for this member.

Figure 3:
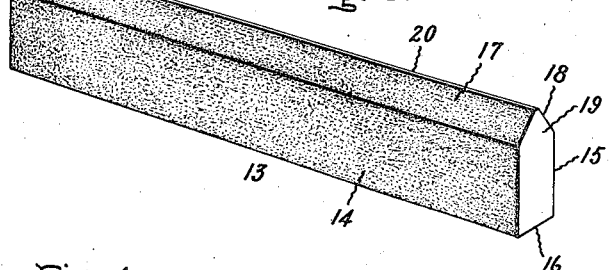
Figure 4:
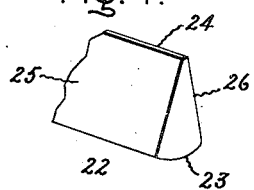

In Fig. 3 I have shown the prism enlarged many times over its actual size in order better to illustrate its construction. Its two side faces 14 and 15 are parallel with each other and its side face 16 is at right angles thereto. Opposite the face 16, two inclined faces 17 and 18 are ground on it, giving the prism a wedge-shaped edge portion 19. Care is taken to have these inclined faces ground flat and to have them form a sharp edge where they meet. This edge is then carefully ground off and polished so as to produce a flat face 20 having a width corresponding to the desired width of the light beam reaching the film. Some of the best results have been obtained with a beam width of about one mil. The opposite face 16 is also ground flat and polished. To limit the light beam to that emerging from the aperture formed by narrow face 20, the faces 17 and 18 and also faces 14 and 15 if desired, although this may not be necessary, are covered with some opaque substance. I prefer to polish these surfaces and silver them whereby the light and heat rays are reflected away rather than absorbed.

The holder 12 is adjustably mounted by suitable means (not shown) very close to the surface of the moving film and the quartz prism 13 is set back in the holder just enough to insure its always being out of actual contact with the film.

In using the apparatus shown in Fig. 1, it will of course be understood that the lens, shown only diagrammatically in Fig. 1, is of such a character and is so placed that light from the source 9 is thrown in a bright band of suitable dimensions on the prism 13. If instead of reproducing the record carried by the film, a new film is to be exposed in the making of a new record, the photo-electric cell will of course not be used and the film must be completely shielded from actinic rays by a suitable housing except where it passes in front of the narrow aperture provided by the prism. Variations in the amount of light reaching the film through the aperture in accordance with the sound waves being recorded may be produced in a variety of ways. One way of producing such variations is disclosed in the aforementioned application of Charles A. Hoxie by which method a record is produced having the appearance of that shown in Fig. 1.

If desired the prism 13 may have a curved rear face, as shown, for example, in the modified form illustrated by Fig. 4. In this figure the prism 22 is shown having a convex rear face 23 which may be suitably curved to cause the light rays engaging it to converge or focus at the narrow face 24 corresponding to the face 20 of the form shown in Fig. 3. In this modification I have also shown the prism as sector-shape in cross section having side faces 25 and 26. With this form of prism it may be found desirable to cover with an opaque covering only those portions of the side faces which are near the narrow face 24 or it may be omitted entirely particularly if the holder extends fully to the narrow face.

What I claim as new and desire to secure by Letters Patent of the United States, is:—

1. The method of making a narrow light aperture by means of a transparent member which comprises forming an edge at one side of the member, and cutting away the edge to form a narrow face of the width of the aperture desired.

2. The method of making a narrow light aperture by means of a transparent member which comprises forming an edge at one side of the member, cutting away the edge to form a narrow face of the width of the aperture desired and covering the surface of the member to cause the light traversing it to be limited to a beam of the width of the narrow face.

3. The method of making a narrow light aperture by means of a transparent member which comprises beveling the sides of the member to form a V-shaped edge, grinding off the edge to form a plane narrow face having a width equal to the width of aperture desired and silvering the beveled sides.

4. In combination, means for guiding a moving film, and means for admitting a narrow beam of light thereto comprising a transparent member having a wedge-shaped portion arranged adjacent the film and terminating in a narrow face.

5. In combination, means for guiding a moving film, means for admitting a narrow beam of light thereto comprising a transparent member having a wedge-shaped portion arranged adjacent the film and terminating in a narrow face, and means for obstructing the passage of light through the side faces of the wedge-shaped portion.

6. In combination, a roller adapted to support a moving film and means for admitting a narrow beam of light to the film comprising a prism of transparent material, the portion of the prism adjacent the film being wedge-shaped and terminating in a narrow plane face and an opaque covering for the sides of the wedge-shape portion.

7. In combination, a roller having a transparent portion adapted to support and guide a moving film, a photo-electric device within the roller, a source of light, and means arranged between the source and the film for permitting a narrow beam only to pass through the film to the device, comprising a prism of transparent material having a wedge-shaped edge arranged adjacent to and transversely of the film and terminating in a narrow face, a holder for the prism engaging opposite sides thereof and an opaque covering on the sides of the wedge-shaped edge.

8. An aperture forming device comprising a transparent prism having a pair of inclined faces forming a wedge-shaped portion and a narrow flat face connecting said inclined faces.

9. An aperture forming device comprising a transparent prism having a pair of inclined faces forming a wedge-shaped portion, a narrow flat face connecting said inclined faces, and an opaque covering on said inclined faces.

10. An aperture forming device comprising a quartz prism having a pair of inclined faces forming a wedge-shaped portion and a narrow flat face connecting said inclined faces, and a silver coating on said inclined faces.

In witness whereof, I have hereto set my hand this 2nd day of July, 1926.

JACOB T. TSCHOPP.